US005555017A

United States Patent [19]
Landante et al.

[11] Patent Number: 5,555,017
[45] Date of Patent: Sep. 10, 1996

[54] SEAMLESS MULTIMEDIA CONFERENCING SYSTEM USING AN ENHANCED MULTIPOINT CONTROL UNIT

[75] Inventors: Diane G. Landante, East Brunswick; Dale L. Skran, Marlboro; Arthur R. Snowdon, Tinton Falls, all of N.J.

[73] Assignee: Lucent Technologies Inc., Murray Hill, N.J.

[21] Appl. No.: 272,349

[22] Filed: Jul. 8, 1994

[51] Int. Cl.⁶ .............................. H04M 11/00; H04N 7/15
[52] U.S. Cl. ............................................................ 348/15
[58] Field of Search ................................. 348/15; 379/94, 379/96, 202, 203, 204, 205; 370/62; H04N 7/15

[56] References Cited

U.S. PATENT DOCUMENTS

| | | | |
|---|---|---|---|
| 4,653,090 | 3/1987 | Hayden | 379/204 |
| 4,686,698 | 8/1987 | Tompkins et al. | 379/53 |
| 4,710,917 | 12/1987 | Tompkins et al. | 370/62 |
| 4,847,829 | 1/1989 | Tompkins et al. | 370/62 |
| 4,953,159 | 8/1990 | Hayden et al. | 370/62 |
| 5,014,267 | 5/1991 | Tompkins et al. | 370/62 |
| 5,065,392 | 11/1991 | Sibbitt et al. | 370/62 |
| 5,136,581 | 8/1992 | Muehrcke | 379/202 |
| 5,195,086 | 3/1993 | Baumgartner et al. | 379/202 |
| 5,323,445 | 6/1994 | Nakatsuka | 379/94 |
| 5,384,771 | 1/1995 | Isidoro et al. | 370/62 |
| 5,402,418 | 3/1995 | Shibata et al. | 348/15 |

OTHER PUBLICATIONS

Bellcore Generic Requirements, GR–1337–CORE, Issue 1, Sep. 1993.
ITU Document H.231 "Multipoint Control Units for Audio-visual Systems Using digital Channels Up to 2 Mbps", Mar. 1993.
ITU Document H.243 "Procedures for Establishing Communication Between Three or More Audiovisual Terminals Using Digital channels Up to 2 Mbps", Mar. 1993.

*Primary Examiner*—William Cumming
*Assistant Examiner*—Stella L. Woo
*Attorney, Agent, or Firm*—Steven R. Bartholomew

[57] ABSTRACT

Techniques are disclosed for controlling the communication of multimedia electronic signals representing audio, video, and/or data. These techniques operate in conjunction with a system including a network and a plurality of endpoint devices connected to the network. A novel MMS is coupled to the network and is equipped to utilize the network such that multimedia signals may be exchanged among a plurality of endpoint devices, thereby providing a multimedia conference. A Multi-Media Server (MMS) provides a multimedia conference independently, such that the reservation system utilized by existing multimedia conferencing system is no longer required. The conference is initiated by a multimedia endpoint that is equipped with a user interface device for encoding user input as BAS signals. The MMS is responsive to BAS DTMF commands issued by endpoint devices to implement multimedia conferences.

7 Claims, 10 Drawing Sheets

ID
SEAMLESS MULTIMEDIA CONFERENCING SYSTEM USING AN ENHANCED MULTIPOINT CONTROL UNIT

BACKGROUND OF THE INVENTION

1. Field of the Invention

The present communications system relates in general to multimedia (audio, video, and/or data) conferencing techniques, and in particular to a multimedia bridging system which utilizes an improved multipoint control unit to provide a variety of features in a manner that constitutes a considerable improvement over the current art.

2. Description of the Prior Art

In the field of multimedia communications, a "bridge" or "multipoint control unit" (MCU) is a computer-controlled device which includes a multiplicity of communication ports which may be selectively interconnected in a variety of ways to provide communication among a group of endpoint devices. MCUs are often used to establish multi-party conference calls. The state-of-the-art MCU is described in ITU Document H.243, "Procedures for Establishing Communication Between Three or More Audiovisual Terminals Using Digital Channels up to 2 Mbps," March 1993, and in ITU Document H.231, "Multipoint Control Units for Audiovisual Systems Using Digital Channels up to 2 Mbps," March 1993.

Generally speaking, such systems require conferences to be prearranged in advance. A series of steps must be performed in order to provide the system topology necessary to implement a multimedia conference call. Typically, the user calls a reservation agent who then directs the MCU to either prepare itself to receive calls at a given time, or to dial out to the user at a given time. These setup procedures are inconvenient, tedious, and inflexible. A clear need exists to provide for "spontaneous" or "on-demand" conferencing where the user does not need to invoke a reservation system to set up a multimedia conference.

Bellcore Generic Requirements GR-1337-CORE, Issue 1, September 1993 contains a description of a "spontaneous" conferencing system based on user control from a touchtone (DTMF) keypad, i.e., with strings of numbers and letters, and audio feedback from stored announcements. This method is widely used in the audio bridging industry for voice calls, and in the Bellcore GR-1337-CORE proposal, the same method is applied to multimedia calls (voice/video).

The method of spontaneous conferencing widely used for audio-only calls, and applied to multimedia calls in GR-1337-CORE, suffers from the following difficulties that represent areas of possible improvement:

1. The strings of numbers require a long period of time to enter. 2. The codes required to perform operations are numerous and difficult to remember. 3. Feedback is limited to audio messages, and the length of these messages is frequently such that the process of conference setup is very slow. 4. The user must make an initial decision to contact the MCU for the purpose of establishing a conference. 5. The MCU contacted via the method of GR-1337-CORE may have no available resources with which to implement a multimedia conference. 6. The user is highly aware of the "seams" (i.e., procedural discontinuities) in the process of constructing the conference. 7. The person initiating the addition of a new party to the conference may wish to have a private conversation with the new party prior to allowing this party into the conference. The purpose of this conference might be to confirm the identity of this new party while allowing the conference to continue. However, existing systems are not equipped to provide such a private conferencing mode. 8. The person initiating the conference might wish to select the conference mode of operation which, for example, determines the selection criteria to be applied in determining the party or parties which will be broadcast to other conference participants at any given moment in time. Typical conference modes include chair mode voice-activated mode, and various other modes known to those skilled in the art. It would be desirable to change this mode during the conference upon command, although such changes are difficult or impossible to implement with state-of-the-art systems.

U.S. Pat. No. 4,653,090, which is owned by the current applicant, describes a system of graphics-based call management which establishes a voice and/or data conference using a graphical user interface. U.S. Pat. No. 4,953,159 (also owned by the current applicant) describes an audio graphics conferencing arrangement controlled by a graphical user interface. In both of the aforementioned patents, graphics-based call management is limited to voice and data calls, and is not applied to video calls.

SUMMARY OF THE INVENTION

Techniques are disclosed for controlling the communication of multimedia electronic signals representing audio, video, and/or data. These techniques operate in conjunction with a system including a network and a plurality of endpoint devices connected to the network. The network is comprised of communications links and switches adapted for selectively connecting and disconnecting the communications links. The endpoint devices are adapted for convening multimedia electronic signals into audio, video, and/or data. A novel multimedia server (MMS) is coupled to the network and is equipped to utilize the network, such that multimedia signals may be exchanged among a plurality of endpoint devices, thereby providing a procedurally continuous multimedia conference.

Use of the MMS described herein eliminates the need for reservation systems which are utilized by existing multimedia conferencing systems. The conference is initiated by a multimedia endpoint that is equipped with a user interface device for encoding user input as BAS signals. For example, the user interface device may include a keypad, in which case key presses are encoded as BAS signals. The characteristics of BAS signals are described in ITU-T H.221/H.230, and are referred to as "BAS DTMF." The term "BAS DTMF" is defined hereinafter in the Detailed Description. The MMS includes an MMS data transceiver for decoding BAS signals. In this manner, the MMS is adapted to communicate with a plurality of endpoint devices over an existing network by utilizing a BAS DTMF-based multimedia communications control protocol.

The BAS DTMF capabilities of the multimedia protocol are extended to provide additional controls from endpoint devices to the MMS, such as the selection of a specific conference mode and the addition of endpoint devices, and the private screening of incoming communications from other endpoint devices. Feedback from the MMS is provided to endpoint devices in the form of audio and/or video messages or tones. Controls from the endpoint device to the MMS include commands to re-establish communications with a selected endpoint device, drop communications with a selected endpoint device, and establish communications with a selected endpoint device. The selected endpoint device is selected by the endpoint device user in conjunction with the user interface device. Feedback from the MMS to the endpoint device include indications specifying the current status of a requested control issued by an endpoint device. If a telephone network is utilized to carry communications to and from endpoint devices, these indications specify whether or not a given telephone number is ringing, busy, answered, connected; or that there are insufficient resources in the MMS or the network to complete the requested action.

DETAILED DESCRIPTION

MMS Reservation System

Figure 1:
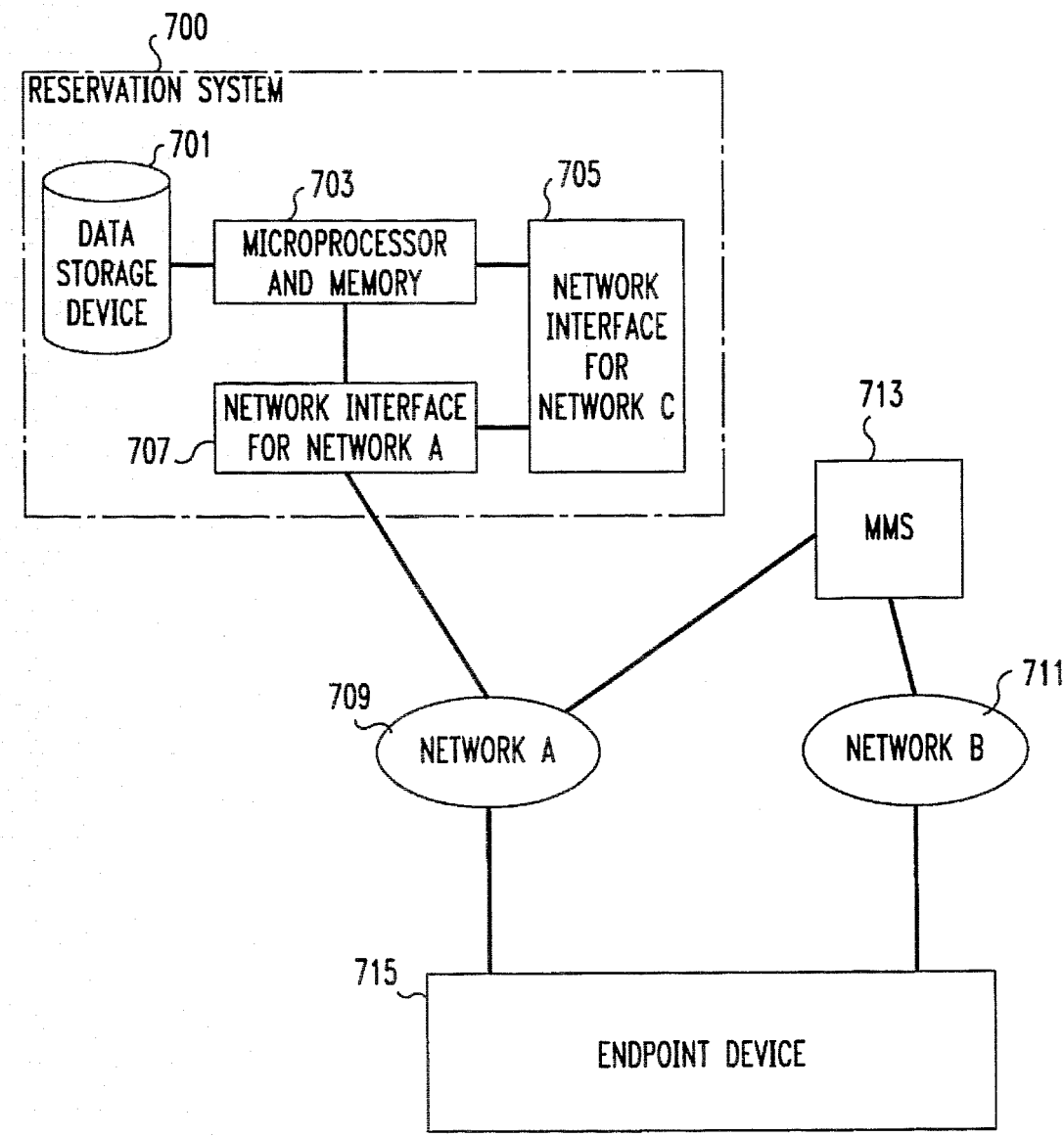
FIG. 1 is a hardware block diagram showing a prior-art multimedia conferencing system which utilizes a reservation system for bridging multimedia signals.

With reference to FIG. 1, a prior-art MMS reservation system 700 is shown. MMS 700 is a device that communicates over a communications network, such as network A 709, to MMS 713 and to endpoint device 715. The reservation system 700 includes one or more network interfaces, such as network interface for network A 707, and network interface for network C 705. In addition to providing a communications protocol interface between network A 709 and reservation system 700, the network interface for network A 707 is responsive to endpoint device 715 requests for MMS 102 resources. Reservation system 700 also includes a microprocessor and memory 703 which issues requests for required information to the endpoint devices, confirms the availability of MMS 102 resources by checking against a database of previous MMS reservations, and responds to endpoint device 715 with access codes and network identifiers as needed stored in a data storage device 701.

Note that MMS 713 may be coupled to a plurality of networks, including network A 709 and network B 711. These networks may or may not be the same network. Endpoint device 715 may be equipped to communicate over a plurality of networks via a network interface for network A 717, and a network interface for network B 719. Bellcore GR-1337-CORE describes an illustrative example of a reservation system 700. Examples of such systems include the AT&T CRS (Conference Reservation System), and CONVENE.

Figure 2:
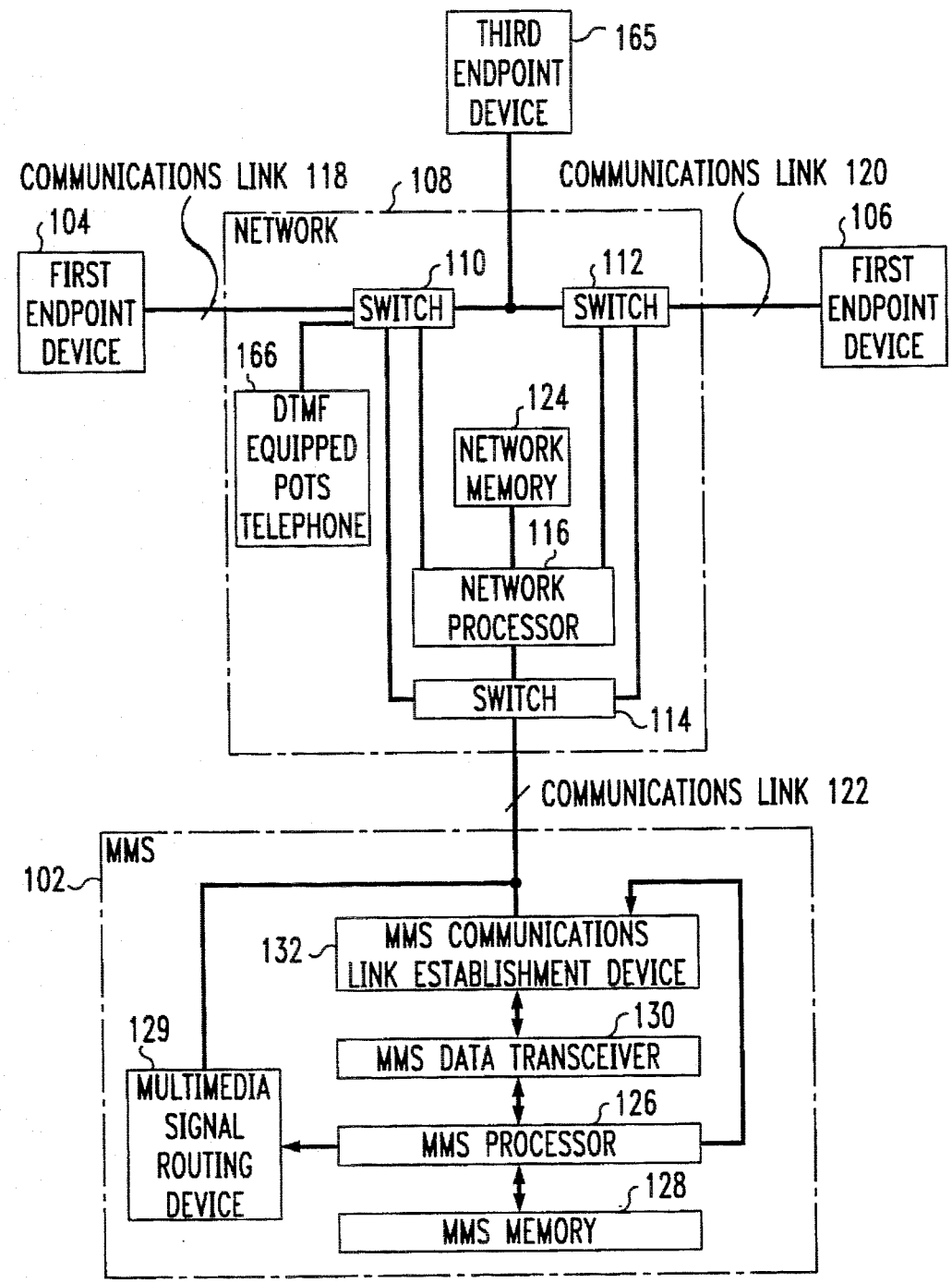
FIG. 2 is a block diagram setting forth the system architecture of a multimedia conferencing system which includes an MMS, a plurality of endpoint devices, and a communications network.

FIG. 2 is a block diagram setting forth the system architecture of a multimedia conferencing system 100 which includes an MMS 102, a plurality of endpoint devices 104, 106, and a network 108. Network 108 includes a plurality of switches 110, 112, 116 connected to a plurality of communications links 118, 120, 122, so as to provide selective interconnection of the communications links. Switches 110, 112, 114 are controlled by a network processor 116 coupled to network memory 124. Communications links 118, 120, 122 may be any known device or devices capable of transporting multimedia electronic signals from one location to another. Multimedia electronic signals are signals which represent data, video, and/or audio information. Examples of communications links 118, 120, 122 include conventional telephonic links, ISDN links, Ethernet connections, Asynchronous Transfer Mode (ATM) links, or the like. Network memory 124 may be any combination of read-only memory (ROM) and random-access memory (RAM). Suitable devices for use as network memory 124 are known to those skilled in the art. Network processor 116 may be a microprocessor of a type known to those skilled in the art. Switches 110, 112, and 114 are adapted for use in conjunction with the specific type or types of communications links 118, 120, 122 employed in the multimedia conferencing system 100. The selection of suitable devices for switches 110, 112, and 114 is a matter well-known to those skilled in the art.

Multimedia server (MMS) 102 provides for the communication of multimedia information among a plurality of endpoint devices 104, 106. The MMS 102 is connected to a plurality of endpoint devices 104, 106 via network 108 over communications link 122. The MMS 102 includes an MMS processor 126 connected to an MMS memory 128. MMS processor 126 controls the operation of an MMS data transceiver 130, an MMS communications link establishment device 132, and a multimedia signal routing device 129. Communications link establishment device 132 may be a conventional call-establishment device of a type well-known to those skilled in the art. MMS data transceiver 130 may be a conventional digital or analog modem, and MMS processor 126 may be a conventional microprocessor device. Communications link 122 could be a plurality of standard wire-pair telephonic links, and MMS memory 128 could be a combination of conventional ROM and RAM. Multimedia signal routing device 129 provides for the selective routing of video, audio, and/or data to and from a plurality of endpoint devices via network 108. The structure and operation of multimedia signal routing device 129 will be described in greater detail hereinafter with reference to FIGS. 6 and 7.

MMS 102 may operate in such a manner that electronic signals representing each medium (i.e., video, audio, and data) are separated into their own virtual circuit comprising a media stream, such that a first media stream carries electronic signals representing video information, a second media stream carries electronic signals representing audio information, and a third media stream carries electronic signals representing data (i.e., FIG. 6, to be described hereinafter). Alternatively, MMS 102 may operate by multiplexing all media streams together into a single media stream (i.e., FIG. 7, to be described hereinafter). It is also possible to combine the two aforementioned media stream approaches, for example, by providing a data/control media stream separate from an audio/video media stream wherein video and audio signals are multiplexed together on a first media stream and data and control signals are multiplexed together on a second media stream. The term "enhanced MMS" is applicable to any MMS constructed in accordance with the principles of the invention disclosed herein.

MMS 102 may be implemented using an MCU. An MCU (multipoint control unit) may be defined as a device which supports the bridging of ITU-T multimedia protocols according to ITU-T H.231/H.243. An MCU is considered to be a specific category of MMS.

A multimedia protocol is any protocol which allows the multiplexing of audio, video, and data together into a single stream adapted for transmission over a communications link. A multimedia protocol may alternatively separate video, audio, and data into three or more streams, where respective streams are accompanied by corresponding control messages. For some protocols, digital encoding techniques are used, while for others analog techniques such as FDM are used. Typically, one or more codings are specified for audio, video, and/or data. The ITU-T H.320 protocol is an example of a standard multimedia protocol. Intel PCS (Personal Conferencing System) is another example, this time of a non-standard protocol. The procedures of this invention apply without regard to the specific multimedia protocol being used.

First endpoint device 104 and second endpoint device 106 are coupled to MMS 102 via network 108. These endpoint devices 104, 106 include one or more user interface devices 105, 107, 109, 111. Each user interface device 105, 107, 109, 111 includes either an input means, an output means, or an input means combined with an output means. Output means are adapted to convert multimedia electronic signals representing audio, video, and/or data into actual audio, video, and/or data. Input means are adapted to accept audio, video, and/or data inputs, and to convert these inputs into electronic signals representing audio, video, and/or data. Examples of user interface devices 105, 107, 109, 111 include video displays, keyboards, microphones, speakers, video cameras, DTMF keypads, or keypads that generate either DTMF signals or "BAS DTMF," or the like.

Endpoint devices 104, 106 are adapted to communicate using any of a number of existing multimedia communication protocols known to those skilled in the art. The endpoint device multimedia communication protocol controls the presentation of media streams (electronic signals representing audio, video, and/or data information) to the endpoint device user. Endpoint devices 104, 106 may function bidirectionally, both sending and receiving multimedia information, or, alternatively, endpoint devices may function unidirectionally, receiving but not sending multimedia information, or sending but not receiving multimedia information. Similarly, in a given multimedia system, some endpoint devices may be equipped to operate bidirectionally whereas other endpoint devices may be equipped to operate unidirectionally.

An example of a suitable endpoint device is an ITU-T H.320 audiovisual terminal, but any device capable of terminating a digital multimedia stream and presenting it to the user constitutes an endpoint device for the purposes of this patent. A particular product example of an H.320 endpoint is the AT&T GIS Vistium. If the endpoint device is a "plain old telephone set" rather than a computer controlled general-purpose device, it cannot by its very nature participate fully in a multimedia conference. However, such an endpoint device could be used to generate electronic signals representing control information, i.e., a control stream, to an MMS via the use of DTMF signals. However, any conference setup and control using such a technology cannot, by its nature, be "seamless". However, many of the features described in this patent could be controlled from such a device. Using DTMF device 166, codes could be sent to an enhanced MMS for various purposes, after joining a conference with 104, 106, and 102, including:

(1) add a party to an ongoing multimedia conference (e.g., *A9496000#), (2) add a party privately to an ongoing multimedia conference (e.g., *P9496001#), (3) change conference mode (e.g., from voice activated switching to broadcast with *MB), (4) drop parties using ITU-T H.243 terminal id number (e.g., *D15-drop endpoint 15), (5) silence parties using ITU-T H.243 terminal id number (e.g., *S13-mute endpoint 13), and (6) make a party the broadcaster using ITU-T H.243 terminal id number (e.g., *H5-make endpoint 5 the broadcaster). Others are possible.

Endpoint devices 104, 106 may utilize various existing signalling techniques and multimedia communication protocols for the purpose of communicating with other system components, such as other endpoint devices 104, 106, MMS 102 and/or network 108. Examples of such signalling techniques and multimedia communication protocols include BAS (AIM, AIA), MBE, NS-com, or the like. Definitions for these protocols and signalling schemes are as follows.

AIA

This is a Bit Rate Allocation Signal (BAS) code that is sent by an endpoint device conforming to the ITU-T H.243 MCU or the ITU-T H.320-standard for the purpose of indicating that audio is active as opposed to muted. This BAS code is defined in ITU-T recommendation H.230.

AIM

This is a Bit Rate Allocation Signal (BAS) code that is sent by an endpoint device conforming to the ITU-T H.243 MCU or the ITU-T H.320-standard for the purpose of indicating that audio is muted. This BAS code is defined in ITU-T recommendation H.230.

BAS code

BAS (Bit Rate Allocation Signals) codes are control messages defined in the ITU-T H.221 recommendation and additionally defined in ITU-T H.230. Such codes are used to control the multimedia multiplex allocation for an ITU-T H.320-conformant endpoint, and to indicate status, such as whether the audio is muted(see AIM/AIA).

BAS DTMF

In the ITU-T H.230 standard, a method is described for encoding numbers into "BAS" (Bit rate Allocation Signals). This method may be used to encode touch-tone key-presses instead of the existing DTMF method of sending sinusoidal tones through a conventional voice channel. Since DTMF in the voice channel is disruptive to the conference and is not very reliable, the "BAS DTMF" is the preferred method of simulating DTMF features on ITU-T H.320 equipment, such as ITU-T H.320-compatible endpoint device and/or MMS. This general approach could be used (although different in detail) with any multimedia protocol.

The term "mode" may be applied in the context of multiplexing multimedia signals on a communications link. In this context, "mode" refers to the combination of coding techniques used to encode/decode the media information and, if the coding technique is a frame-based one, the particular bit rate allocations being used. For example, in ITU-T H.320, a typical mode might include ITU-T G.711 audio, ITU-T H.261 video, and ITU-T 6.4 kbs low-speed data as described in ITU-T H.221.

Returning now to FIG. 2, the illustrative hardware embodiments set forth for the first and second endpoint devices 104, 106, respectively, will be described further. Communications links 118, 120 may be conventional telephonic communications lines, such as wire pairs, fiber optic cable, ISDN lines, or the like.

The multimedia conferencing techniques disclosed herein provide for controlling the communication of multimedia electronic signals representing audio, video, and/or data. These techniques are operable in conjunction with the system shown in FIG. 2 and including network 108, multimedia server (MMS) 102 connected to network 108, and the plurality of endpoint devices 104, 106 connected to network 108. The network 108 is comprised of communications links 118, 120, 122 and switches 110, 112, 114 adapted for connecting and disconnecting the communications links 118, 120, 122. The endpoint devices 104, 106 are adapted for convening multimedia electronic signals into audio, video, and/or data. MMS 102 is equipped to control network 108 such that multimedia signals may be exchanged among a plurality of endpoint devices 104, 106, thereby providing a multimedia conference.

To summarize the techniques discussed in conjunction with FIG. 2, at least one of the endpoint devices 104 includes an endpoint communications link establishment device 136, an endpoint data transceiver 140, an endpoint processor 144, endpoint memory 148, and one or more user interface devices 105, 107. The MMS 102 includes an MMS communications link establishment device 132, an MMS data transceiver 130, an MMS processor 126, an MMS memory 128, and a multimedia signal routing device 129.

Several novel methods are disclosed for implementing a multimedia conference. The network 108 assigns the MMS 102 a network address uniquely specifying a particular MMS 102. Techniques are disclosed for controlling the communication of multimedia electronic signals representing audio, video, and/or data. These techniques operate in conjunction with a system including a network and a plurality of endpoint devices connected to the network. The network is comprised of communications links and switches adapted for selectively connecting and disconnecting the communications links. The endpoint devices are adapted for convening multimedia electronic signals into audio, video, and/or data. A novel multimedia server (MMS) is coupled to the network and is equipped to utilize the network, such that multimedia signals may be exchanged among a plurality of endpoint devices, thereby providing a procedurally continuous multimedia conference.

Use of the MMS described herein eliminates the need for reservation systems which are utilized by existing multimedia conferencing systems. The conference is initiated by a multimedia endpoint that is equipped with a user interface device for encoding user input as BAS signals. The characteristics of BAS signals are described in ITU-T H.221/H.230, and are referred to as "BAS DTMF." The MMS includes an MMS data transceiver for decoding BAS signals. In this manner, the MMS is adapted to communicate with a plurality of non-enhanced endpoint devices over an existing network by utilizing a BAS DTMF multimedia communications protocol.

The BAS DTMF capabilities of the multimedia protocol are extended to provide additional controls from endpoint devices to the MMS, such as the selection of a specific conference mode and the private screening of incoming communications from other endpoint devices. Feedback from the MMS is provided to endpoint devices in the form of audio and/or video messages or audio tones. Controls from the endpoint device to the MMS include commands to re-establish communications with a selected endpoint device, drop communications with a selected endpoint device, and establish communications with a selected endpoint device. The selected endpoint device is chosen by the endpoint device user in conjunction with the user interface device. Feedback from the MMS to the endpoint device include indications specifying the current status of a requested control issued by an endpoint device. If a telephone network is utilized to carry communications to and from endpoint devices, these indications specify whether or not a given telephone number is ringing, busy, answered, connected; or that there are insufficient resources in the MMS or the network to complete the requested action. Similar indications could be provided for other networks, such as Ethernet.

In accordance with a preferred embodiment disclosed herein, the MMS 102 is enhanced as follows: The MMS is equipped with a data transceiver 130 for receiving requests for the creation of "progressive" or "spontaneous" conferences. The MMS 102 also includes an MMS communications link establishment device 132, for example, in the form of dial-out means for dialing out onto a telephone line when such an operation is requested by an endpoint device 104, 106 in the conference for the purpose of incorporating an additional endpoint device or devices 104, 106 into the conference. The MMS 102 includes private communications link means in the multimedia signal routing device 129 for providing a private conference between the endpoint device 104 initiating the dial-out and the endpoint device 165 to be incorporated into the conference, while continuing to maintain the original conference with 106. This original conference takes place between endpoint device 106 and one or more additional endpoint devices, if present. The MMS data transceiver 130 also includes means for receiving and acting on requests received from the initiating endpoint device 104 for a particular conference mode.

Figure 3:
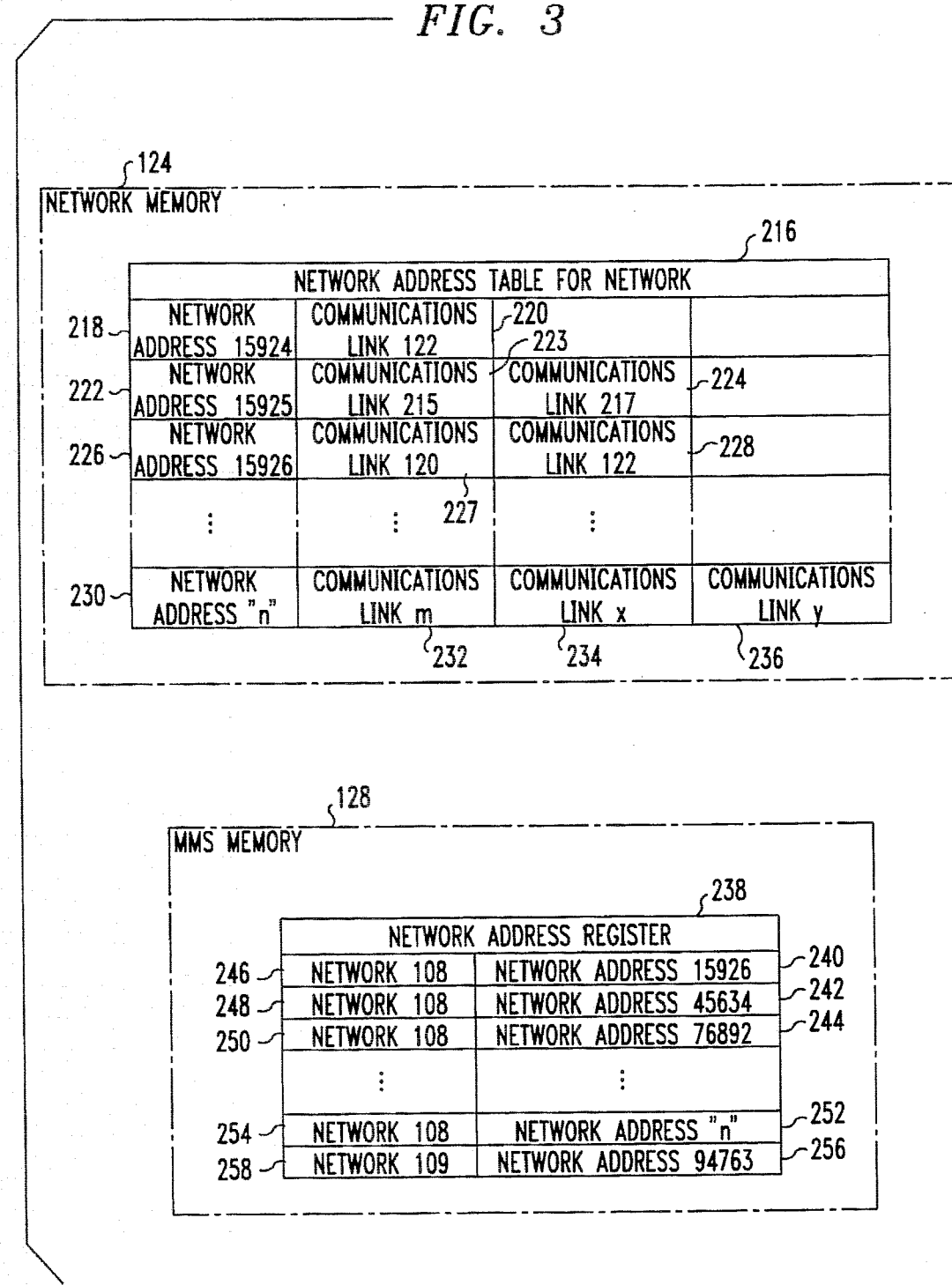
FIG. 3 sets forth the data structures utilized by the multimedia conferencing system of FIG. 2.

FIG. 3 sets forth the data structures utilized by network 108, and MMS 102 of FIG. 2. Network memory 124 is organized to include one or more network address tables for network 216. Each of these network address tables for network 216 associates a given network address with a corresponding list of one or more communications links. For example, network address 15924 stored in field 218 is associated with communications link 122 stored in field 220. Network address 15925 stored in field 222 is associated with communications links 215 and 217, stored in fields 223 and 224, respectively. Network address 15926 (field 226) is associated with communications links 120 and 122 (fields 227 and 228, respectively). Network address "n" (field 230) is associated with three communications links, referred to as "m", "x", and "y", and stored in fields 232, 234, and 236, respectively.

MMS memory 128 contains one or more network address registers 238. Each network address register 238 associates a given network with a given network address. For example, network 108 (fields 246, 248, 250, and 252) is associated with network addresses 15926, 45634, 76892, and n (fields 240, 242, 244, and 252, respectively). Network 109 (field 258) is associated with network address 94763 (field 256).

Figure 4:
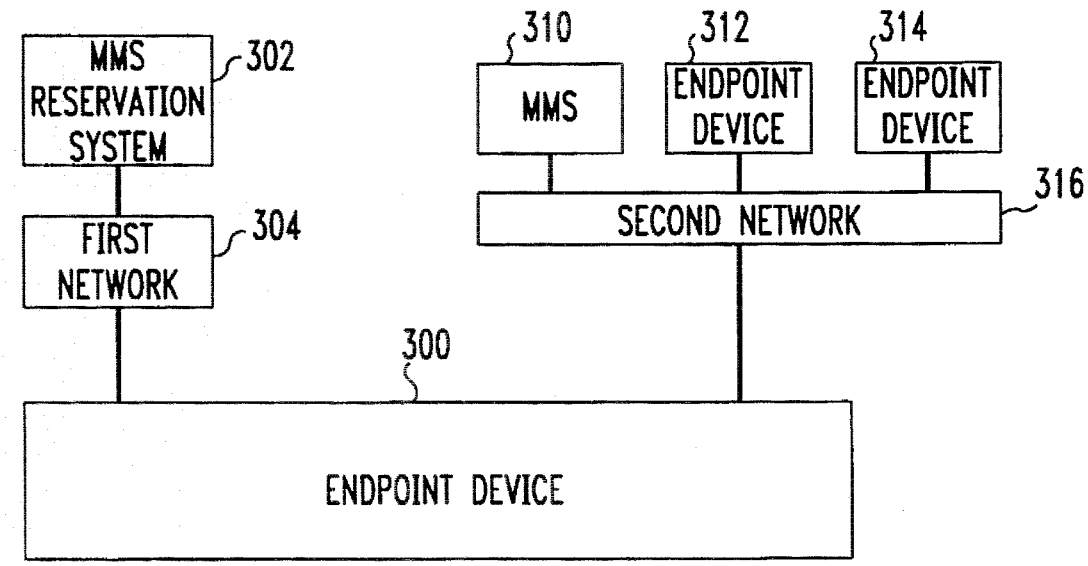
FIG. 4 is a hardware block diagram setting forth system configuration for a preferred embodiment disclosed herein.

FIG. 4 sets forth a hardware configuration for an exemplary endpoint device 300 constructed according to a preferred embodiment disclosed herein. In this example, endpoint device 300 is coupled to a first network 304 and a second network 316. First network 304 provides a connection to an MMS reservation system 302, and second network 316 provides connections to an MMS 310, endpoint device 312, and endpoint device 314. In the configuration of FIG. 2, endpoint device 300 may be incorporated into the multimedia conferencing system as endpoint device 104 and/or endpoint device 106. Alternatively, other types of endpoint devices may be used for endpoint devices 104, 106.

Figure 5:
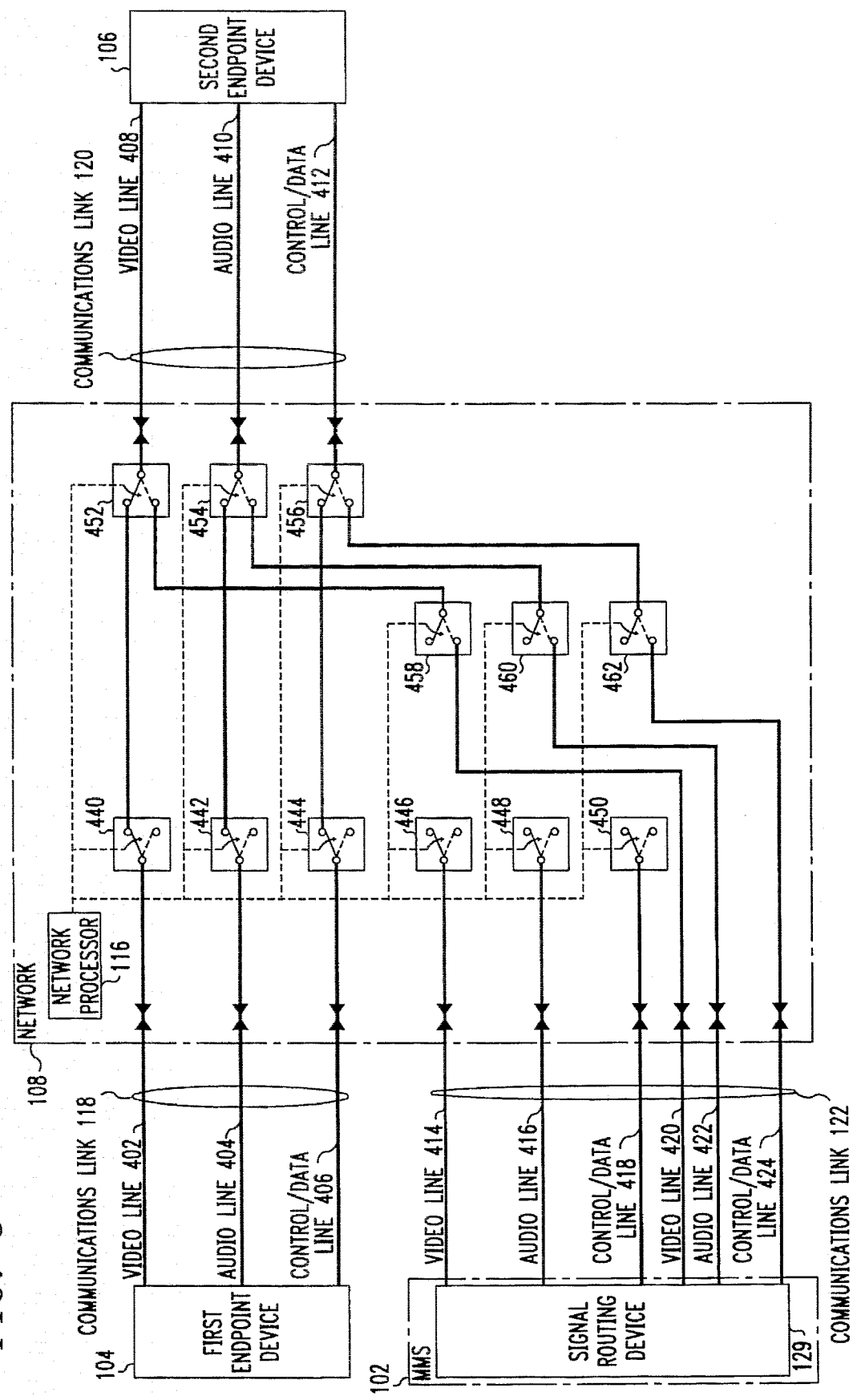
FIG. 5 is a hardware block diagram setting forth the system topology of network 108 in the context of multimedia signals.

FIG. 5 is a hardware block diagram setting forth the system topology of network 108 (FIG. 2) in the context of multimedia signals such as audio, video, and data. Many existing networks 108 (FIG. 2) were developed for the purpose of switching voice and/or data, and are not especially well-suited to the wide bandwidth requirements of video. Examples of such networks include conventional central switching office equipment and computer local area networks (LANs). Moreover, certain prior art networks, such as the central switching office example discussed above, were developed to handle point-to-point communications to and from a first party and a second party.

Difficulties arise when conventional networks are called upon to implement a multipoint communications connection between three or more parties, i.e., between three or more endpoint devices. Difficulties also arise with respect to the implementation of video communications links. Accordingly, special hardware and software are required to implement video communications over a network, and special hardware and software are also required to implement multipoint communications. The MMS 102 (FIG. 2) was developed for the purpose of providing multipoint communications in a multimedia environment (including video), where the parties requiring communication services are restricted to using endpoint devices connected to conventional networks 108. The MMS 102 is geared to utilizing network 108 such that network 108 conveys multimedia information to and from selected endpoint devices, in a manner consistent with the needs of communication services recipients.

FIG. 5 demonstrates the manner in which a conventional network 108 may be adapted for multimedia conferencing applications through the use of an MMS 102. In the example of FIG. 5, network 108 is a conventional central switching office at a local telephone company. The network 108 was designed for the purpose of carrying voice communications over point-to-point links and includes a plurality of communication pathways such as lines 402–424 for this purpose. However, these lines 402–424 may be grouped together to carry information, such as video and data, in addition to voice. Although network 108 is described as a central switching office, this is done for illustrative purposes, it being understood that the network could be another type of existing network, such as a LAN.

First endpoint device 104 is connected to network 108 via communications link 118, which contains a video line 402, an audio line 404, and a control/data link 406. (In actuality, video line 402 could represent several conventional wire pairs, whereas audio line 404 may only include one conventional wire pair.) Video line 402 connects to switch 440 in network 108. Audio line 404 connects to switch 442, and control/data line 406 connects to switch 444.

Second endpoint device 106 is connected to network 108 via communications link 120, which contains video line 408, audio link 410, and control/data line 412. Video line 408 connects to switch 452, audio line 410 connects to switch 454, and control/data line connects to switch 456.

Signal routing device 129 of MMS 102 is connected to network 108 via communications link 122. This communications link 122 includes a plurality of video lines 414, 420, a plurality of audio lines 416, 422, and a plurality of control/data lines 418, 424. Video line 414 connects to switch 446 in network 108, audio line 416 connects to switch 448, control/data line 418 connects to switch 450, video line 420 connects to switch 458, audio line 422 connects to switch 460, and control/data line 424 connects to switch 462.

The switches 440–462 of network 108 are under the control of network processor 116, which may be a conventional microprocessor device known to those skilled in the art. The network processor 116 controls the operation of each switch 440–462, and selectively connects and/or disconnects a given switch (i.e., switch 440) to/from another switch (i.e., switch 452). The circuit topology of network 108 with respect to switches 440–462 is shown for illustrative purposes only, it being understood that network 108 may include any switching topology equipped to selectively connect and/or disconnect a plurality of communication links.

Figure 6:
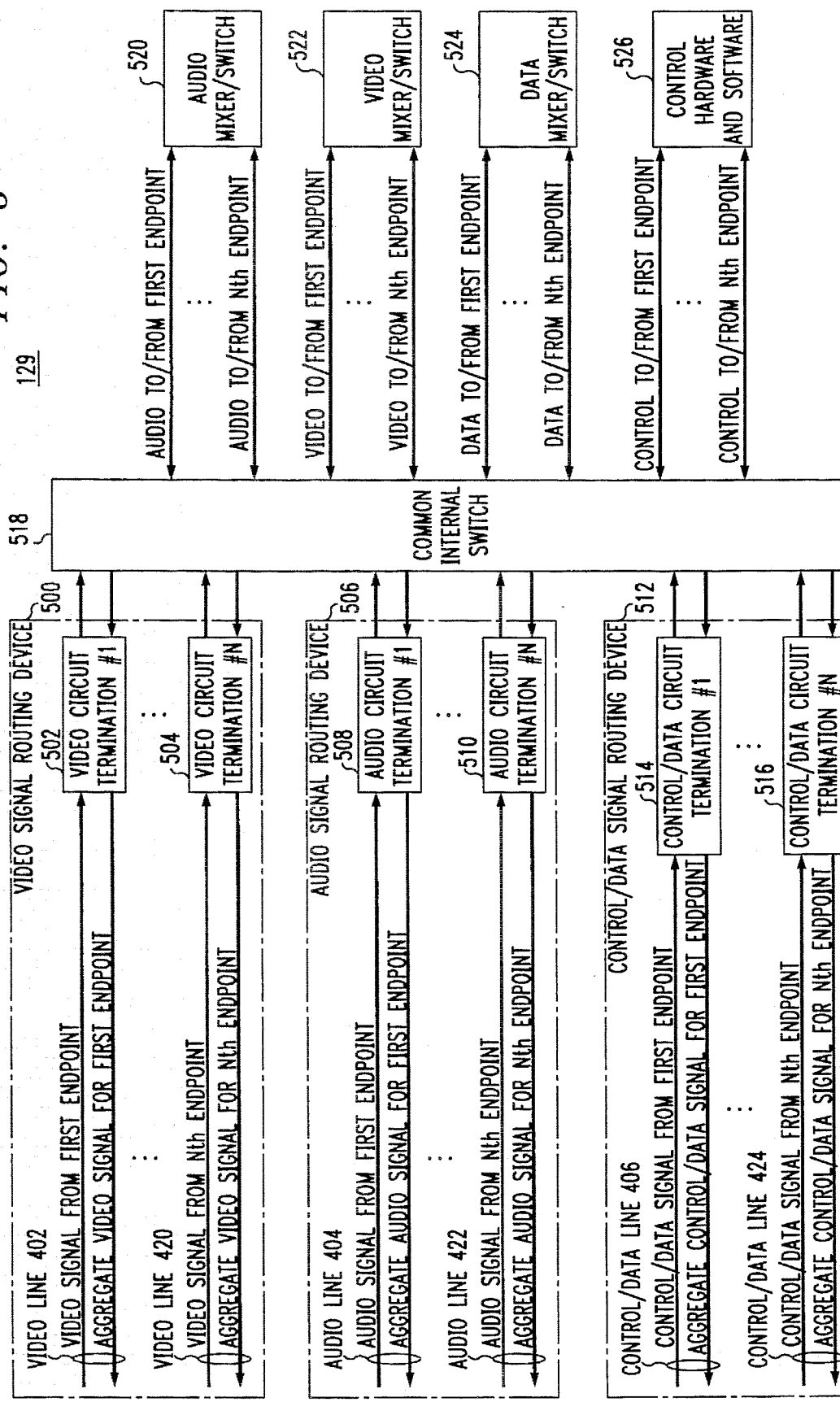
FIG. 6 is a hardware block diagram of a multimedia signal routing device for use in the MMS of FIG. 2 wherein each of the individual media (i.e., video, audio, data) is carried over a separate communications link from the MMS to an endpoint device.

Refer now to FIG. 6, which sets forth the hardware configuration for the signal routing device 129 of MMS 102 (FIGS. 2 and 5). Signal routing device 129 provides for the bidirectional switching and mixing of a plurality of electronic multimedia signals to/from a plurality of endpoint devices 104, 106 (FIG. 2). The signal routing device of FIG. 6 is designed to process video, audio, and control/data signals separately. However, signal processing device 129 could alternatively be designed to process these signals in a multiplexed manner. The signal routing device 129 of FIG. 6 interfaces with each endpoint device 104, 106 via network 108 (FIG. 2). Signal routing device 129 includes three signal routing entities: an audio signal routing device 506, a video signal routing device 500, and a control/data signal routing device 512. With respect to audio signal routing device 506, an electronic multimedia signal representing audio from first endpoint device 104 is coupled to audio line 404 through network 108. An aggregate audio signal representing audio to first endpoint device 104 is also coupled to audio line 404 through network 108. Audio line 404 interfaces with audio circuit termination #1 (508), which is equipped to buffer, switch and/or amplify audio signals.

In a manner analogous to that of audio signal routing device 506, video signal routing device 500 selectively routes electronic multimedia signals among a plurality of endpoint devices 104, 106 (FIG. 2). Video signals to and from first endpoint device 104 are coupled to video line 402 via network 108. Video line 402 interfaces with a first video circuit termination #1 (502), which buffers, amplifies and/or switches video signals. Similarly, control/data line 406 handles control/data signals to and from first endpoint device 104. This control/data line is coupled to control/data circuit termination #1 (514), which buffers, amplifies, and/or switches control/data signals.

Signals from additional endpoint devices, i.e., from an Nth endpoint device, are routed in a manner analogous to that described above for first endpoint device 104. For example, audio to and from the Nth endpoint device traverses audio line 422, video to and from the Nth endpoint device traverses video line 420, and control/data signals to and from the Nth endpoint device traverse control/data line 424. Audio line 422 is coupled to audio circuit termination #N (510), video line 420 is coupled to video circuit termination #N (504), and control/data line is coupled to control/data circuit termination #N (516).

Audio circuit termination #1 (508), audio circuit termination #N (510), video circuit termination #1 (502), video circuit termination #N (504), control/data circuit termination #1 (514), and control/data circuit termination #N (516) are all coupled to a common internal switch 518 equipped to switch, buffer, and/or amplify multimedia electronic signals. The common internal switch 518 is equipped to independently process a plurality of multimedia electronic signal types. For instance, electronic signals representing audio information are processed using a set of audio switches, signals representing video information are processed using a set of video switches, and signals representing control/data are processed using a set of control/data switches.

Common internal switch 518 is coupled to an audio mixer/switch 520, a video mixer/switch 522, a data mixer/switch 524, and control hardware equipped with control software 526. Audio mixer/switch 520 mixes and switches audio to and from all endpoint devices, video mixer/switch 522 mixes and switches video to and from all endpoint devices, and data mixer/switch 524 mixes and switches data to and from all endpoint devices. Control hardware and software 526 includes a microprocessor and memory adapted to execute the control software. This control software controls the operation of the switches within common internal switch 518.

Figure 7:
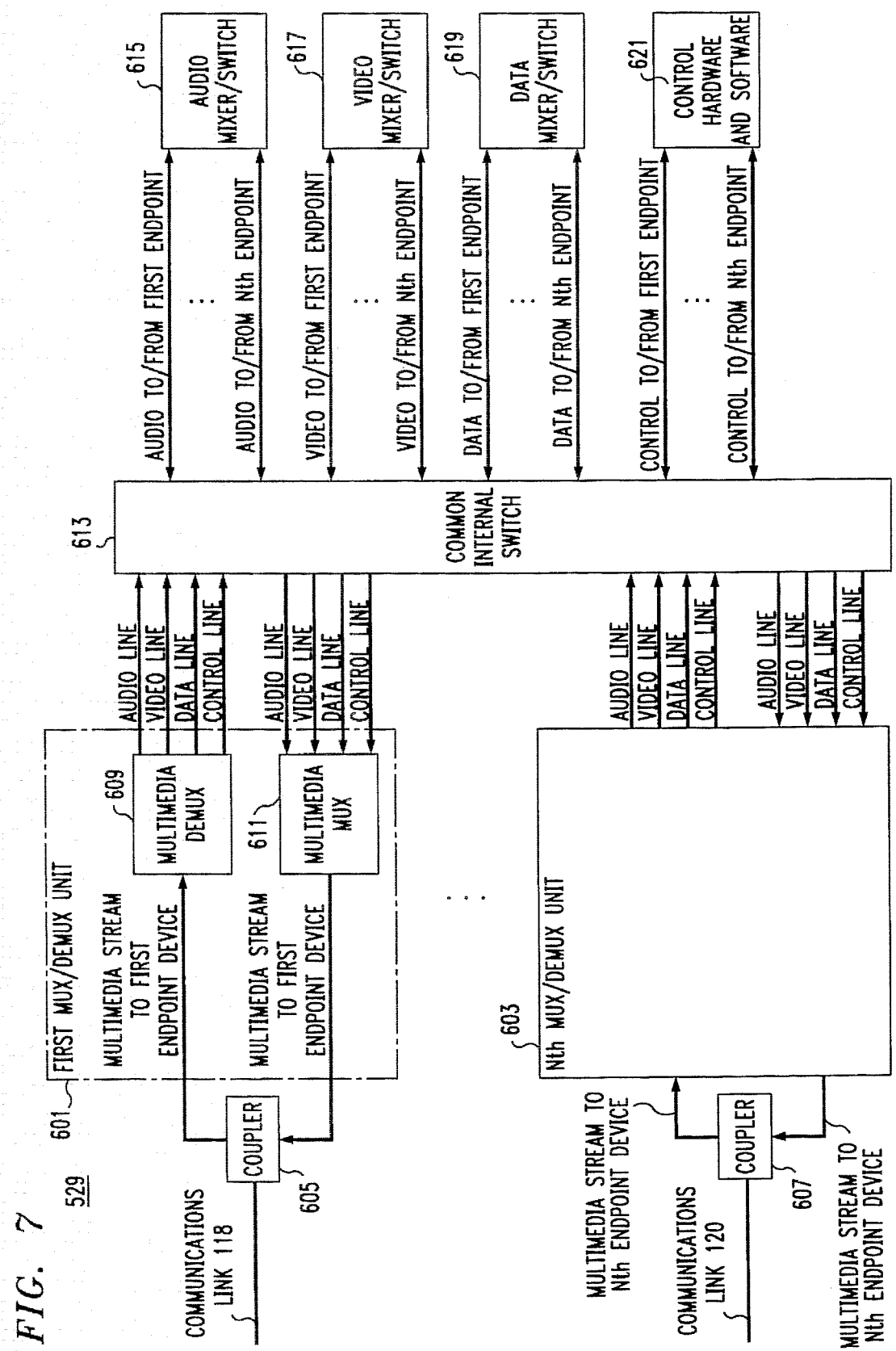
FIG. 7 is a hardware block diagram of a multimedia signal routing device for use in the MMS of FIG. 2 that supports multimedia protocols where, for each endpoint device, all media (i.e., video, audio, data) are multiplexed onto a single communications link in the form of a connection between the endpoint and the MMS.

FIG. 7 sets forth an alternate embodiment of the hardware configuration for the signal routing device 129 of MMS 102 (FIGS. 2 and 5). Note that the signal routing device 129 described in FIG. 6 utilizes discrete processing circuitry for video, audio, and control/data signals, such that each type of signal is processed by a separate group of circuits at the point where the signal routing device 129 interfaces with endpoint devices 104, 106. By contrast, the signal routing device 529 of FIG. 7 is designed to process all video, audio and control/data signals to and from a particular endpoint device over a single communications link, wherein the video, audio, and control/data signals are communicated in a multiplexed manner according to any of the existing multimedia communications protocols known to those skilled in the art. The signal routing device 529 of FIG. 7 may be employed as an alternative to the signal routing device 129 of FIG. 6 in the hardware configuration of FIG. 2 as "signal routing device 129." Endpoint device 104 (FIG. 2) communicates with signal routing device 529 over communications link 118, and endpoint device 106 (FIG. 2) communicates with signal routing device 529 over communications link 120. Signal routing device 529 utilizes a coupler 605, 607 at each communications link 118, 120, respectively, for the purpose of separating multimedia signals according to the direction in which these signals traverse communications links 118, 120. For instance, coupler 605 separates multimedia signals transmitted from endpoint device 104 (and destined for signal routing device 529), from multimedia signals transmitted by other endpoint devices 106 and destined to be received by endpoint device 104. Therefore, couplers 605, 607 are three-port devices which separate a bidirectional multimedia signal stream presented at a first port into an outgoing multimedia signal stream at a second port and an incoming multimedia signal stream at a third port.

The incoming multimedia signal stream from coupler 605 is routed to a multimedia demultiplexer (DEMUX) 609, and the outgoing multimedia stream from coupler 605 is routed to a multimedia multiplexer (MUX) 611. Taken together, MUX 611 and DEMUX 609 comprise a first MUX/DEMUX unit 601. Multimedia DEMUX 609 separates the incoming multimedia signal stream into four components: a first component comprising electronic signals representing audio, a second component comprising electronic signals representing video, a third component comprising electronic signals representing data, and a fourth component comprising electronic signals representing control. Multimedia MUX 611 accepts a plurality of incoming multimedia signal components, such as a first component representing audio, a second component representing video, a third component representing data, and a fourth component representing control. The MUX 611 integrates these four components onto a single multimedia signal stream. These four components are fed to MUX 611 from a common internal switch 613. Likewise, DEMUX 609 feeds these four signal components into the common internal switch 613. Common internal switch 613 contains a plurality of electronic switches, buffers, and amplifiers under the control of control hardware and software 621. Control hardware and software 621 includes a microprocessor and memory. Common internal switch 613 is coupled to an audio mixer/switch 615 for mixing and switching electronic signals representing audio; common internal switch 613 is also coupled to a video mixer/switch 617 and a data mixer/switch 619 for mixing and switching electronic signals representing video and data, respectively.

The apparatus and method of the present invention involves the use of an existing network 108, endpoint devices 104, 106, and an enhanced Multimedia Server (MMS) 102 (FIG. 2). The invention provides improved multipoint call setup, as will be described with reference to FIG. 8. The flowcharts of FIG. 8 are based upon the utilization of a system such as that of FIG. 2, wherein a first party, a second party, and a third party are all equipped with endpoint devices as shown in FIG. 2. The parties have access through the network 108 to each other, and also are able to access a Multimedia Server (MMS) and an MMS reservation system.

Figure 8A:
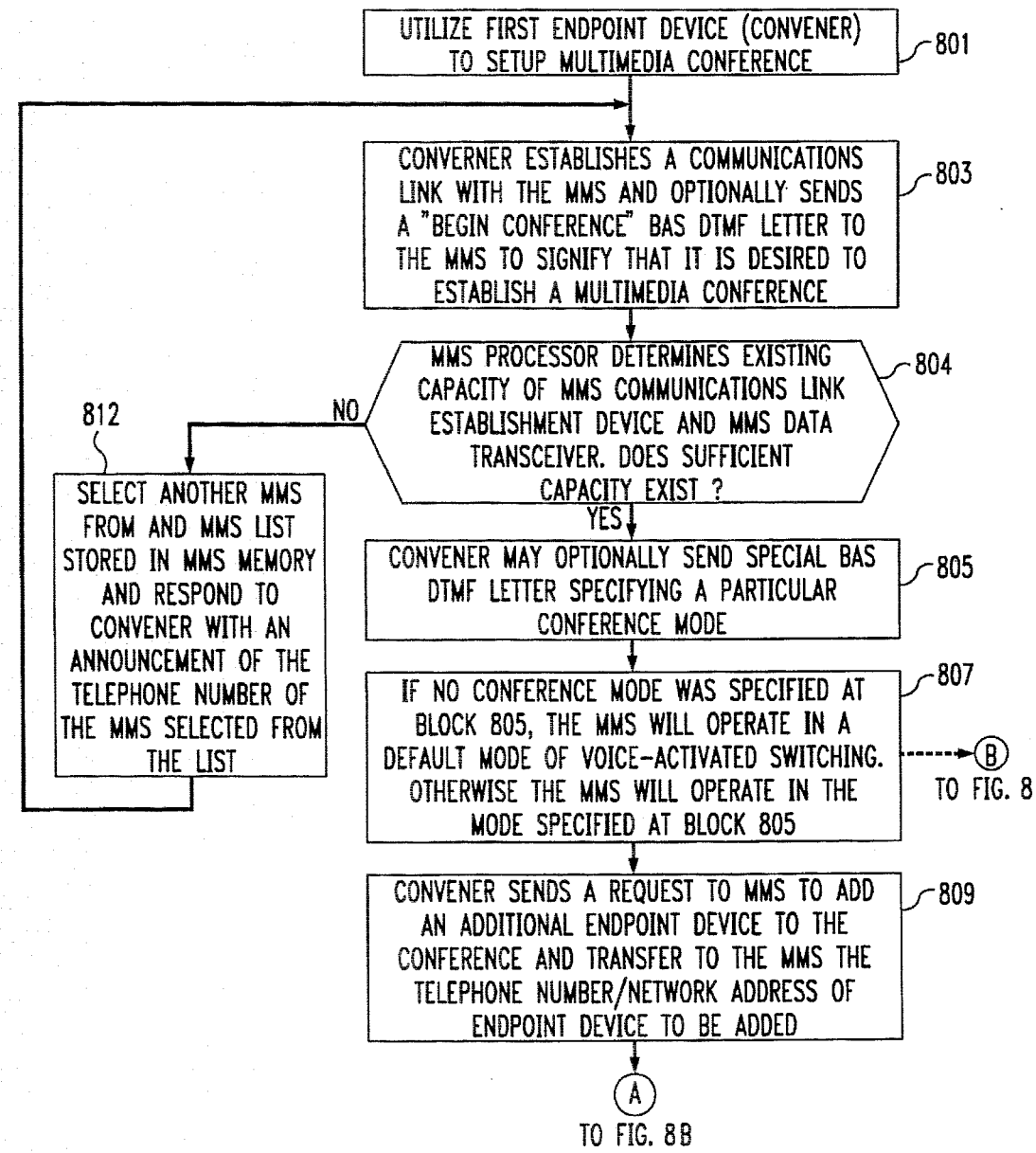
FIGS. 8A, 8B and 9 are flowcharts setting forth procedures whereby an MMS implements a multimedia conference call.
Figure 8B:
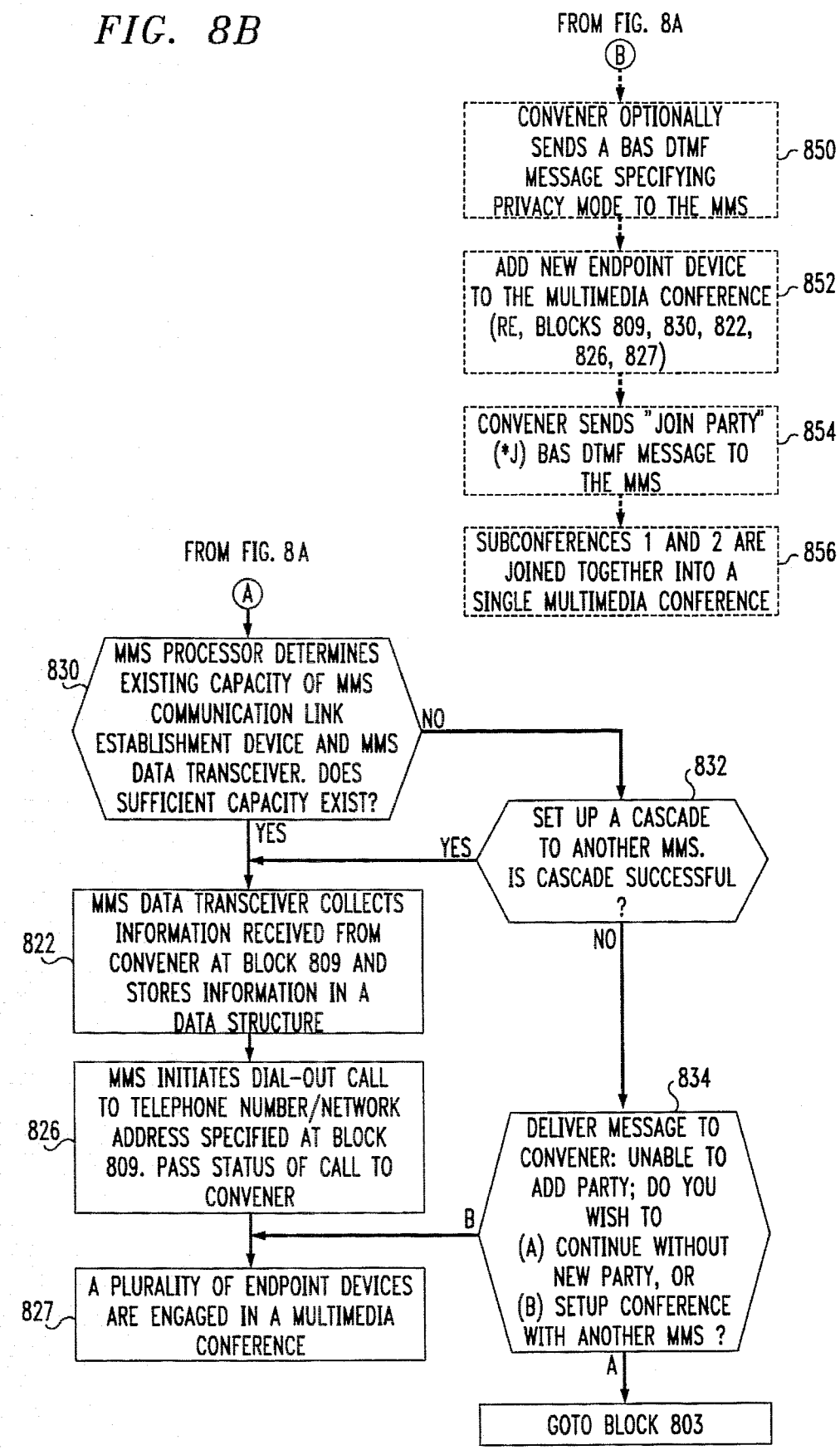

Referring to FIGS. 8A–8B, a first endpoint device 104 (FIG. 1) is utilized for the purpose of setting up a multimedia conference (block 801). Hereinafter, this endpoint device will be referred to as the convener. The convener establishes a communications link with the MMS 102 (FIG. 2) and optionally sends a "begin conference" BAS DTMF letter followed by the number of parties expected in the conference (e.g., *BE6#) to the MMS to signify that it is desired to establish a multimedia conference (block 803) for 6 endpoints. Upon receipt of the "begin conference" BAS DTMF letter sent by the convener, the MMS implements the conference, as will be described in greater detail below. Note that the MMS need not be provided with any information as to whether the convenor was engaged in a point-to-point call previous to the issuance of the "begin conference" command, and is adding a third party, or whether the convenor is just beginning a conference. At block 805, the convenor has a choice of sending a special BAS DTMF letter by using the user interface device of the endpoint device to signify a specific conference mode (i.e., voice-activated switching, broadcast, chair control). The user interface devices of endpoint devices may, therefore, include DTMF keypads or the like. If the MMS does not receive a special BAS DTMF letter before the commencement of the establishment of a communications link with another endpoint device, i.e., before the telephone number digits begin to be sent, the MMS will operate in a default conference mode of voice-activated switching (block 807).

There are two points at which the MMS evaluates MMS hardware and software resources to see whether or not the MMS can accommodate a conferencing request: first, at block 804, after receiving the initial "begin conference" BAS DTMF; and, second, when receiving a request to add another party to the conference (block 809). Upon receipt of the initial conference request (block 803), the MMS will determine the existing capacity of the MMS communications link establishment device, the MMS data transceiver (block 804), the MMS processor 126, the MMS memory 128, the MMS multimedia signal routing device 129, and other resources. If the MMS processor determines that there are no resources left to handle the initial conference setup, the MMS processor will select another MMS from an MMS list stored in MMS memory and respond with an announcement of the phone number for the MMS selected from the MMS list (block 812). The convenor may then establish a communications link with this other MMS selected from the MMS list and try to establish a multimedia communications link again (block 803).

When ready to proceed, the convenor will send an "add party" (i.e., add an endpoint device) BAS DTMF (*A9497500#) message (block 820). BAS DTMFs are used by the convenor to transfer the telephone number(s) and/or network addresses of the endpoint devices to be added to the conference to the MMS. The MMS data transceiver is equipped to collect this digit string, and these digits are then stored in a data structure such as party_num[0][0] in MMS memory (block 822). The MMS proceeds upon receipt of the dial string termination (#) to initiate a dial-out call to the new party, i.e., the new endpoint device (block 826). If the dial-out call is successful, a plurality of endpoint devices are now engaged in a multimedia conference. Further, the status of the dial-out call is passed back to the convenors through announcements such as: "the call is currently being dialed", "is ringing", "is busy", etc. These announcements may be audio and/or visual.

The MMS also performs hardware and software resource checking when responding to a request to add a party (block 809). This scenario is slightly different than that described above (block 804) for conference initiation. When the MMS determines it does not have enough resources to handle the addition of another endpoint device ("party") to an existing conference (block 830), it can automatically set up a cascade as defined in H.243 to another MMS to allow for growth of the conference (block 832). If the MMS determines it is unable to set up this cascade (block 834), (for example, no other available MMS), it will send a recorded message to the convenor saying it is unable to add the party at this time. It is the choice of the convenor to continue without adding the new party, or to drop the conference and try to set it up on another MMS.

As an option, the convenor can choose to have a private conversation with the new endpoint device (party) before the endpoint device (party) is added to the conference. The convenor sends an "add private" BAS DTMF message to the MMS (e.g. *P9492300#) (block 850). After the new party is added to the conference (block 852) with the convenor, the convenor sends a "join party" BAS DTMF (e.g. *J) to the MMS (block 854). At this point, the new endpoint and the convenor join the ongoing conference. There are many different methods an MMS can use to implement the privacy feature. Two methods will be provided here: Method 1 (simple): Disconnect audio/video to/from all other endpoints in the conference except the endpoint device from which it is sought to add a new endpoint device (i.e., a new party). This can be done by internally turning off a listen/send signal from the MMS to the endpoint devices. When the "join" BAS DTMF message is received, the audio/video to/from these endpoint devices will be returned by internally turning on listen/send to the endpoint devices; all parties can now see/hear each other. Method 2 (telephone-like): Create 2 sub-conferences, one (1) for the party (A) using a first endpoint device to add a second endpoint device used by party (B) to an existing conference, and one (2) for all other endpoint devices in the existing conference. All parties in sub-conference (2) can see/hear each other, but they cannot see/hear party A or B. When party B is added, it is added to conference 1 and can see/hear only party A. After the "join" BAS DTMF message is received, subconferences 1 and 2 are joined together; all parties can now see/hear each other (block 856).

Figure 9:
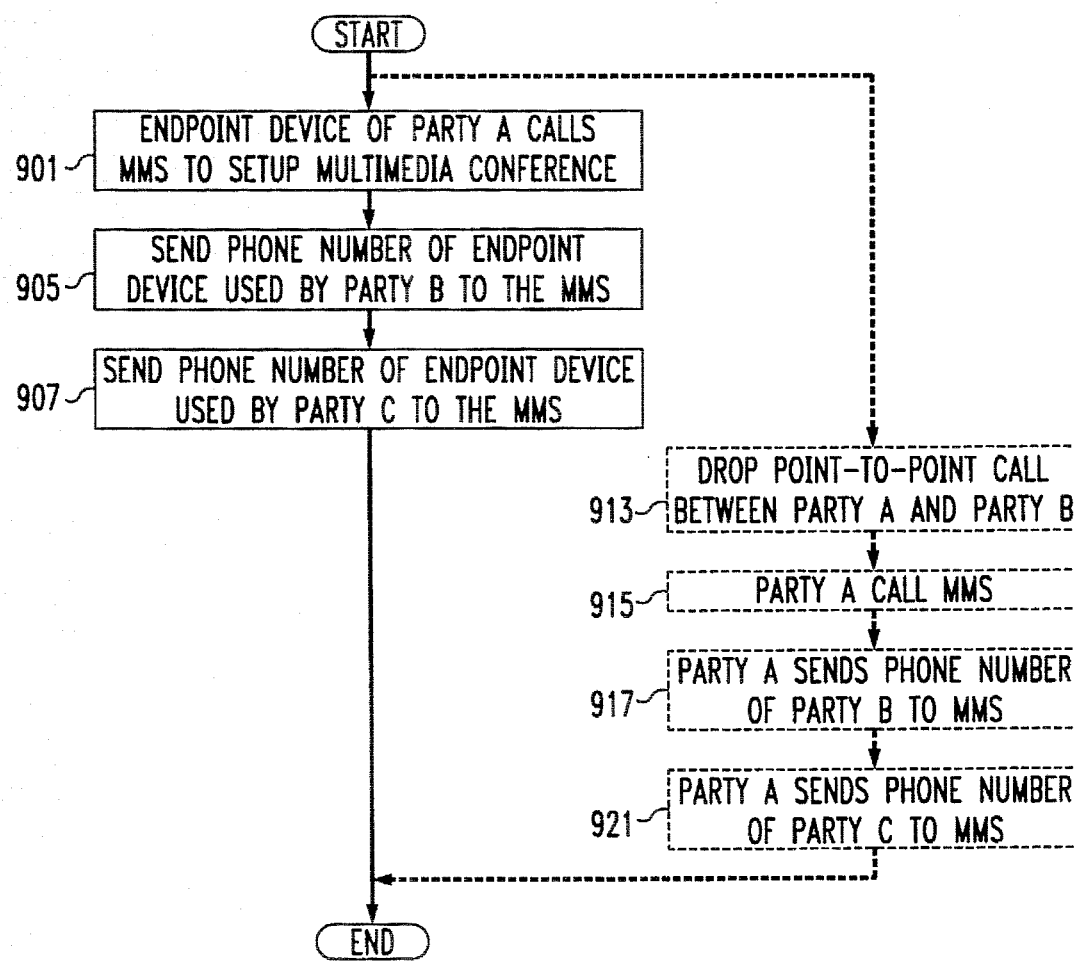

Any endpoint capable of sending BAS DTMF letters and numbers to the MMS can create a conference, as well as add and delete other parties. The endpoint devices may be used to implement a multimedia conference in one of two ways, as will be described in conjunction with FIG. 9. With reference to block 901, the endpoint device establishes a communications link with (i.e., calls) the MMS to set-up the multimedia conference prior to conference initiation. This is accomplished, for example, by calling the MMS to set up a video conference. Send the phone number(s) of the endpoint device used by party (B) to the MMS (block 905). Send the phone number(s) of the endpoint device used by party (C) to the MMS (block 907). Alternatively, while active on a point-to-point video call with party (B), decide to add a 3rd party (C), which entails: Drop the point-to-point call (block 913). Call the MMS to set-up a video conference (block 915). Send the phone number(s) of (B) to the MMS (block 917). Send the phone number(s) of (C) to the MMS (block 921).

The MMS allocates and deallocates its resources dynamically, as parties are added and dropped from the conference. Upon completion of the conference, the MMS will delete its record of the conference, and all resources are immediately available to be used in another progressive multimedia conference.

Therefore, the description here covers the preferred method of partitioning functions, but it is recognized that other methods are possible.

We claim:

1. A method for implementing a multimedia conference in a system comprising
   i) a network including a plurality of network communications links, each network communications link being associated with a network address;
   ii) a multimedia server (MMS) coupled to the network and comprising
      a) multimedia bridge means for mixing and switching multimedia electronic signals representing audio, video, data, and control among a plurality of endpoint devices through the network;
      b) MMS communications link establishment means for establishing multimedia communications links on the network;
      c) MMS network address transceiver for transmitting and receiving network addresses over the network;
      d) processing means comprising a microprocessor; and
      e) memory means;
   iii) a plurality of endpoint devices, including a first and a second endpoint device, each endpoint device comprising
      a) user interface means for accepting input from a user and for providing multimedia output to a user, the multimedia output including at least one of audio, video, and data;
      b) endpoint communications link establishment means for establishing communications links on the network;

c) an endpoint network address transceiver for transmitting and receiving network addresses over the network;
d) processing means including a microprocessor; and
e) memory means;

THE METHOD INCLUDING THE STEPS OF:
a) the network assigning the MMS a network address uniquely specifying a particular MMS; and
b) the MMS responding to BAS DTMF commands issued by endpoint devices.

2. A method for implementing a multimedia conference as set forth in claim 1 further including the step of the MMS providing a private communications link between the first and a third endpoint device such that the second endpoint device is excluded from the private communications link, the private communications link being provided during any time interval for which the first and second endpoint devices are engaged in a multimedia conference.

3. A method for implementing a multimedia conference in a system comprising
  i) a network including a plurality of network communications links, each network communications link being associated with a network address;
  ii) a multimedia server (MMS) coupled to the network and comprising
   a) multimedia bridge means for mixing and switching multimedia electronic signals representing audio, video, data, and control among a plurality of endpoint devices through the network;
   b) MMS communications link establishment means for establishing multimedia communications links on the network;
   c) an MMS network address transceiver for transmitting and receiving network addresses over the network;
   d) processing means comprising a microprocessor; and
   e) memory means;
  ii) a plurality of endpoint devices, including a first and a second endpoint device, the first endpoint device comprising:
   a) user interface means for accepting input from a user and for providing multimedia output to a user, the multimedia output including at least one of audio, video, and data;
   b) endpoint communications link establishment means for establishing communications links on the network;
   c) an endpoint network address transceiver for transmitting and receiving network addresses over the network;
   d) processing means including a microprocessor; and
   e) memory means;
  and the second endpoint device comprising a telephonic device equipped to generate DTMF (dual-tone, multi-frequency) tones;

THE METHOD INCLUDING THE STEPS OF:
a) the network assigning the MMS a network address uniquely specifying a particular MMS; and
b) the MMS responding to DTMF commands issued by the second endpoint device.

4. The method of claim 3 wherein the DTMF commands include a command that specifies an addition of a third endpoint device to an existing conference between the first and second endpoint devices.

5. The method of claim 3 wherein the system further includes a third endpoint device engaged in a conference with the first and second endpoint devices, the method characterized in that the DTMF commands include a command that selects between (a) voice-activated switching between the first, second, and third endpoint devices; and (b) broadcasting from the first endpoint device to the second and third endpoint devices.

6. The method of claim 3 wherein the DTMF commands include a command that specifies a disconnection of an endpoint device from an existing conference.

7. The method of claim 3 wherein the DTMF commands include a command that mutes audio from the first endpoint device.

\* \* \* \* \*